United States Patent [19]

Diaz et al.

[11] Patent Number: 4,478,612

[45] Date of Patent: Oct. 23, 1984

[54] DRYING SUBSTANTIALLY SUPERCRITICAL CO₂ WITH GLYCEROL

[75] Inventors: Zaida Diaz, Houston; James H. Miller, Katy, both of Tex.

[73] Assignee: Shell Oil Company, Houston, Tex.

[21] Appl. No.: 517,594

[22] Filed: Jul. 27, 1983

[51] Int. Cl.³ .............................................. B01D 53/14
[52] U.S. Cl. .............................................. 55/29; 55/32
[58] Field of Search .................................... 55/29–32, 55/68

[56] References Cited

U.S. PATENT DOCUMENTS

| | | |
|---|---|---|
| 2,235,322 | 3/1941 | Martin ..................................... 55/31 |
| 3,676,981 | 7/1972 | Afdahl ..................................... 55/30 |
| 4,005,997 | 2/1977 | Fowler et al. .......................... 55/32 |
| 4,235,289 | 11/1980 | Weeler .................................. 166/267 |

FOREIGN PATENT DOCUMENTS 18268  8/1974  Japan ..................................... 55/32

Primary Examiner—Charles Hart

[57] ABSTRACT

In drying supercritical or nearcritical CO₂ for use at supercritical conditions, the loss of desiccant, contamination of product, compressor horsepower requirements, and heat requirements can be substantially minimized by using glycerol as the desiccant.

5 Claims, 4 Drawing Figures

DRYING SUBSTANTIALLY SUPERCRITICAL $CO_2$ WITH GLYCEROL

BACKGROUND OF THE INVENTION

This invention relates to a process for drying moist $CO_2$ at conditions near or above the critical point of $CO_2$ (87.9° F. and 1071 psia). More particularly, the present invention relates to an efficient process for drying supercritical or nearcritical $CO_2$ to an extent materially reducing its corrosivity by drying it with glycerol to minimize the loss of desiccant, contamination of dried $CO_2$, heat requirements and/or compressor horsepower expenditures which would be encountered when drying $C_2$ under the same conditions with a glycol desiccant.

Numerous desiccants and systems for drying gases are described in U.S. patents such as the following: U.S. Pat. No. 2,812,830 describes a system using triethylene glycol (TEG) and recycling partially spent TEG while removing most of the water with dry TEG. U.S. Pat. No. 3,390,511 describes a gas drying system using aqueous electrolyte desiccant adsorbed on water soluble carrier pellets such as sodium chloride pellets. U.S. Pat. No. 3,609,942 describes the drying of wet hydrocarbon gases at pressures of from about 500 to 2000 psig with ethylene glycol or other glycols. U.S. Pat. No. 3,750,369 describes a system for regenerating spent liquid desiccants such as a glycol or hygroscopic solution of electrolytes such as lithium, calcium or other chloride salts. U.S. Pat. No. 3,885,926 describes an aqueous desiccant solution of calcium chloride and magnesium nitrate which is said to be particularly suitable for dehydrating hydrocarbon gases. U.S. Pat. No. 4,235,289 describes a system for producing supercritical $CO_2$ from a subterranean reservoir and drying it with TEG to provide dried supercritical $CO_2$. U.S. Pat. No. 4,344,486 describes an oil recovery process for producing $CO_2$ containing contaminants such as hydrocarbons and hydrogen sulfides from an underground reservoir, burning the mixture to form a concentrated carbon dioxide stream, compressing and dehydrating that stream with molecular sieves or ethylene glycol, and injecting the treated $CO_2$.

Such patents contain no suggestion of any significant problem due to a glycol such as TEG remaining dissolved in the dehydrated $CO_2$.

An article in Oil and Gas Journal, Nov. 8, 1971, page 53, describes preliminary plans for pipelining $CO_2$ to the Sacroc unit of the Wasson field for use in oil recovery. The article describes the desirability of maintaining a pressure greater than about 1400 psig to keep the $CO_2$ supercritical and indicates that a maximum of 50 parts per million of water in the dehydrated $CO_2$ would adequately prevent corrosion of the pipeline. It also indicates that, in pilot tests, drying with TEG appeared satisfactory but "little experience exists in large scale dehydration of $CO_2$ produced from natural gas wells". An Oil and Gas Journal article (Jan. 3, 1983, page 92) relating to $CO_2$ injection for enhanced oil recovery, indicates that the gas should be dehydrated to a water dew point of about 10° F. below the minimum ambient temperature and that TEG offers the best combination of ease in operation and economics since dew points obtained with it are normally within the range required for $CO_2$ handling systems. An Oil and Gas Journal article (Mar. 21, 1983, page 160) indicates that "Corrosion by $CO_2$ can be prevented in gas transmission lines by dehydrating the gas to less than 60% relative humidity for the coldest portion of the pipeline." and also that oil-soluble amine film-forming inhibitors can be used in $CO_2$ pipelines.

In summary, the prior art teachings and beliefs indicate (1) the desirability of pipelining $CO_2$ as a supercritical single phase fluid, (2) the desirability of drying such $CO_2$ to a non-corrosive moisture content, and (3) an expectation that triethylene glycol is the best desiccant for such a drying operation.

SUMMARY OF THE INVENTION

The present invention relates to drying moist $CO_2$ at conditions at least near the critical point for $CO_2$ to provide a dried $CO_2$ at a pressure of from about 1200 to 2400 psi which is dry enough to be substantially noncorrosive. A stream of the moist $CO_2$ at a temperature of from about 70° to 120° F. and a pressure of at least about 1200 psi is flowed into and out of contact with enough desiccant glycerol to effect the drying at a pressure high enough and a temperature low enough to substantially minimize the energy required for compression, while heat requirements, desiccant loss and product contamination are substantially minimized by the limited mutual solubility of the glycerol and $CO_2$.

DESCRIPTION OF THE INVENTION

The present invention is, at least in part, premised on a discovery that a significant problem exists in a large scale use of the previously suggested procedures for drying supercritical or nearcritical $CO_2$ to a substantially noncorrosive degree. The desiccant previously considered to be the most cost effective and versatile, triethylene glycol, has been found to exhibit an undesirably high solubility which varies widely with relatively small variations in pressure and temperature. Applicants have discovered that, due to a surprisingly low mutual solubility of glycerol and supercritical $CO_2$, the disadvantages due to loss of desiccant, contamination of product and excessive heat and compression requirements (which disadvantages are inherent in drying supercritical $CO_2$ with other polyhydric alcohol, when the $CO_2$ is to be used at supercritical conditions) can be substantially reduced by drying the $CO_2$ with glycerol. For example, if the pressure of the inflowing moist $CO_2$ should be limited to about 1200 psi (due to other constraints such as the facilitating of a removal of an inhibitor oil used during the production of the $CO_2$ from a subterranean reservoir) although the dried $CO_2$ is to be pipelined at about 2000 psi, the dehydration temperature can be kept relatively low to minimize the horsepower requirements for compressing the dried $CO_2$ while the desiccant losses and product contamination are also kept low by using glycerol as the desiccant. In the absence of such extraneous factors, further savings may be attainable by producing and drying the $CO_2$ at a pressure closer to the pipeline pressure without the necessity of increasing its temperature—due to the unique relationship between the solubilities of glycerol and supercritical $CO_2$.

Figure 1:
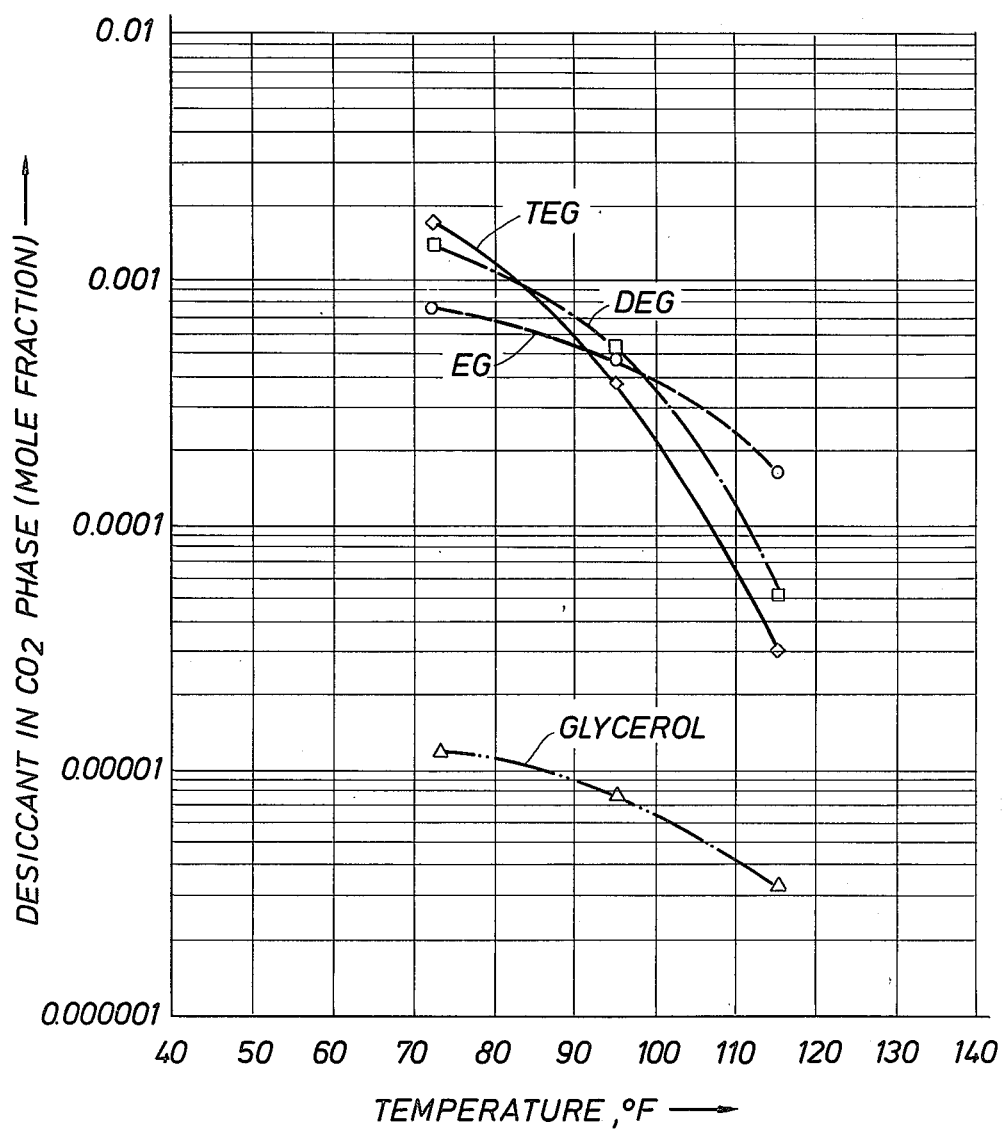
FIG. 1 shows a comparison of the solubilities of four polyhydric alcohol desiccants in supercritical $CO_2$ at 1200 psi and from about 70° to 120° F.

FIG. 1 shows a comparison of the solubilities of triethylene glycol, diethylene glycol, ethylene glycol and glycerol (in terms of mole fraction of desiccant in the $CO_2$) at 1200 psi and temperatures ranging from about 70° to 120° F. The solubilities were measured by equilibrating those desiccants with $CO_2$ in a stirred autoclave, using contact times of about 20 hours. Samples of the $CO_2$-phase were taken in small high pressure tubes, while keeping the pressure in the autoclave constant by adding $CO_2$. The $CO_2$ in each sample tube was then expanded into a wet test meter. The tube was then washed with water to collect the alcohol and the water was analyzed by gas chromatography. The solubilities of the desiccants (in pounds per million standard cubic feet of $CO_2$) are summarized in Table 1.

TABLE 1

| SOLUBILITY OF DRYING AGENTS IN $CO_2$ AT 1200 PSI | | | |
|---|---|---|---|
| | Solubility (lbs/MMSCF $CO_2$) | | |
| Drying Agent | 73° F. | 95° F. | 115° F. |
| Glycerol | 3 | 2 | 0.8 |
| EG | 120 | 76 | 26 |
| DEG | 390 | 150 | 15 |
| TEG | 680 | 150 | 12 |

It is apparent from the data shown in FIG. 1 and Table 1 that, of the desiccants tested, glycerol is the least soluble in $CO_2$. At 73° F. and 1200 psi the solubility of glycerol in $CO_2$ is about 230 times smaller than the solubility of TEG. Under the same conditions, ethylene glycol is about 5 times, and diethylene glycol about 2 times, less soluble than TEG.

Figure 2:
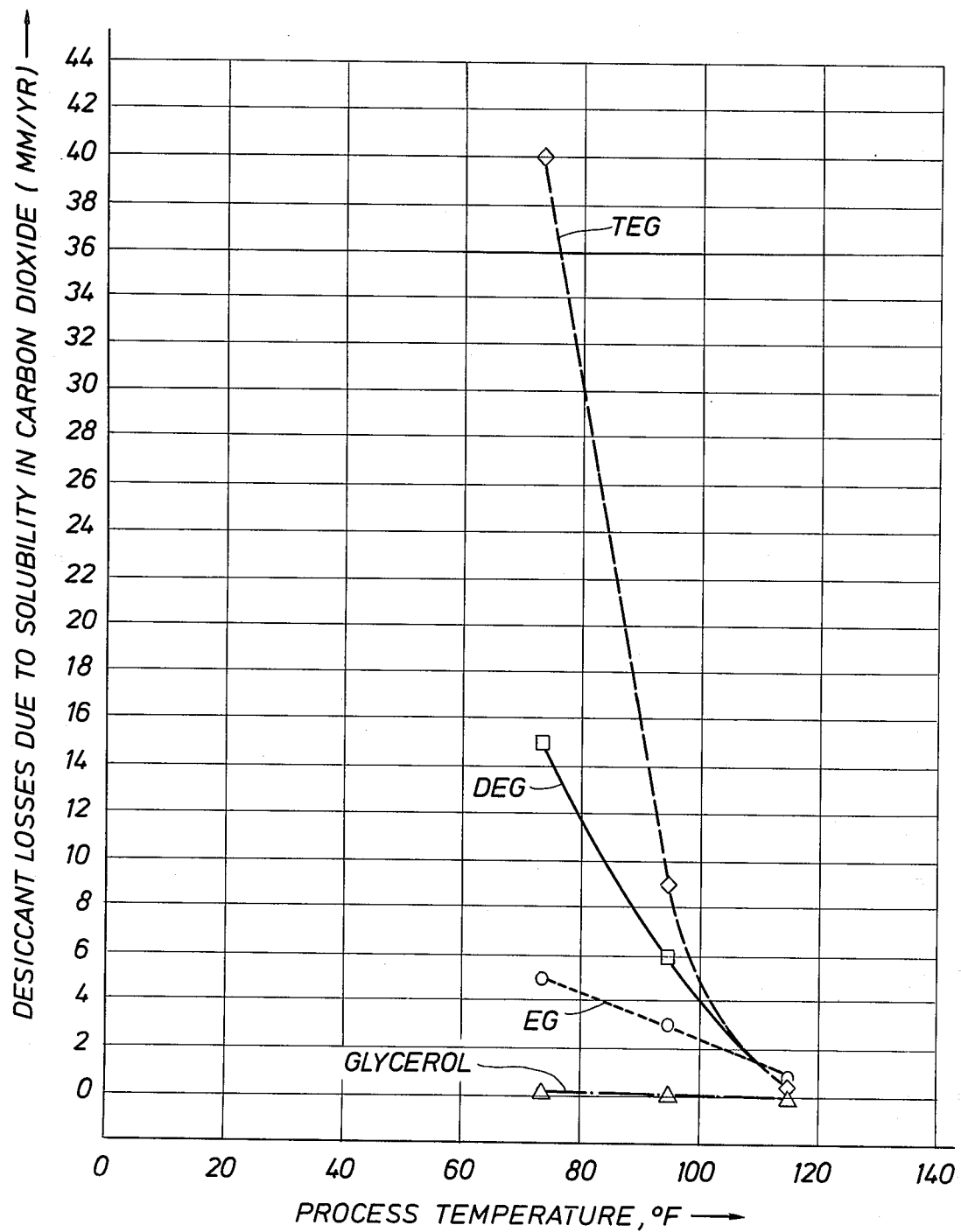
FIG. 2 shows a comparison of the chemical costs in dollars per year due to the solubilities shown in FIG. 1.

FIG. 2 and Table 2 show the expense of desiccant losses (in millions of dollars per year) due to the solubility of the desiccant in $CO_2$ during a production of 400 million standard cubic feet per day of $CO_2$ (where the desiccant costs are those listed in Table 2).

TABLE 2

| | CHEMICAL LOSSES DUE TO SOLUBILITY IN $CO_2$ AT 1200 PSI | | | |
|---|---|---|---|---|
| | Desiccant cost | Chemical Losses ($MM/YR) | | |
| Desiccant | ($/lb)[a] | 73° F. | 95° F. | 115° F. |
| Glycerol | 0.72 | 0.3 | 0.2 | 0.09 |
| EG | 0.28 | 5 | 3 | 1 |
| DEG | 0.27 | 15 | 6 | 0.6 |
| TEG | 0.41 | 40 | 9 | 0.7 |

[a]Chemical Marketing Reporter, January 10, 1983.

It is apparent that the desiccant losses at 73° F. and 1200 psi can be reduced by about $40 million dollars per year by using glycerol in place of TEG. At 115° F. and 1200 psi, losses are significantly smaller and so is the saving by using glycerol in place of TEG. But it may be undesirable to heat the $CO_2$ to 115° F. before dehydration due to higher heat loads, and extra horsepower requirements for compressing the dried $CO_2$ to the delivery pressure. Exemplary values of the energy required to compress $CO_2$ with 75% efficiency from 1200 psia to 2000 psia and at various initial temperatures are given in Table 3.

TABLE 3

| COMPRESSION OF $CO_2$ FROM 1200 PSIA TO 2000 PSIA WITH 75% EFFICIENCY | |
|---|---|
| Initial Temperature (°F.) | Energy Required for Compression (BTU/lb $CO_2$) |
| 80 | 4.0 |
| 100 | 7.4 |
| 120 | 11.0 |

Figure 3:
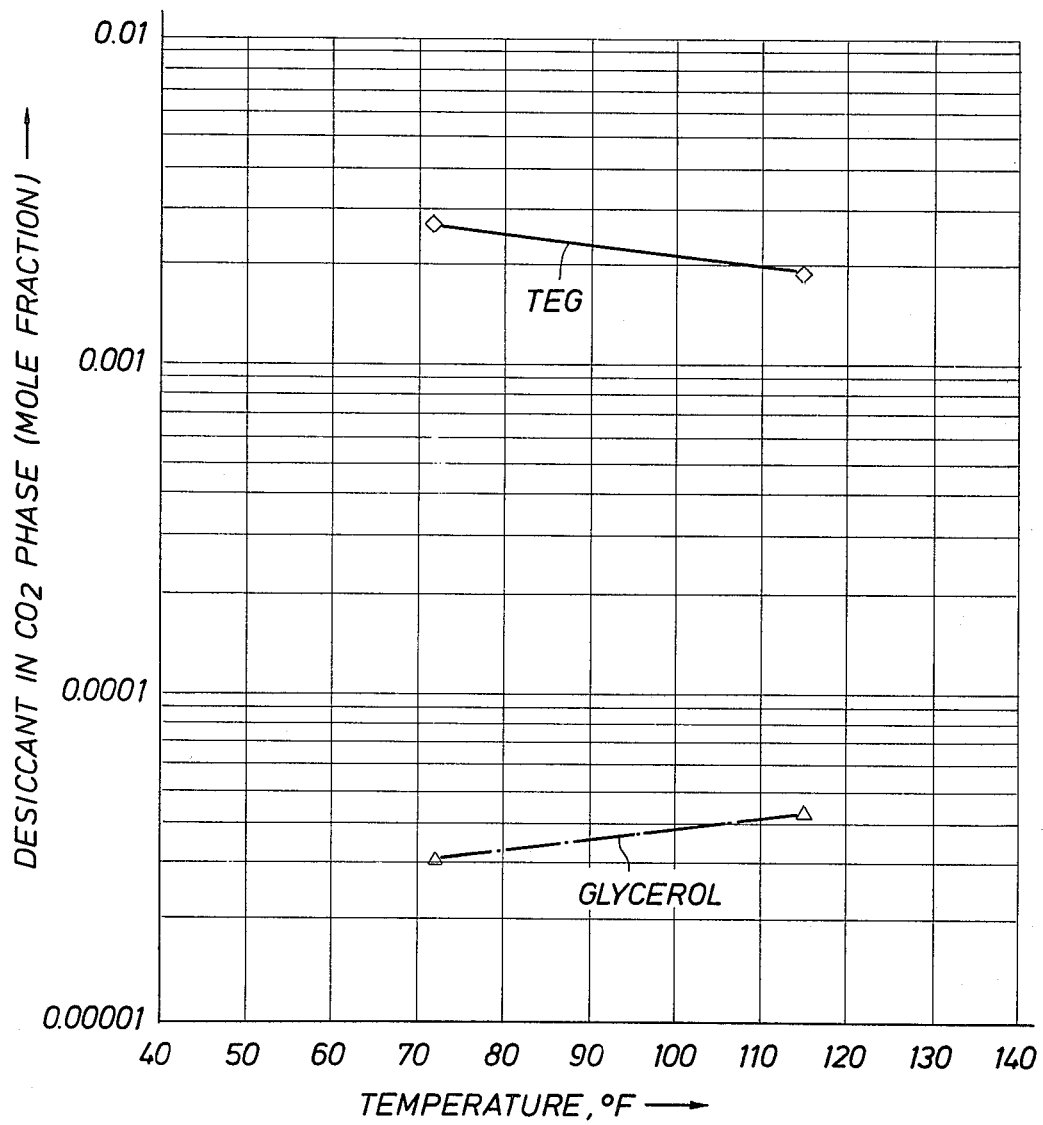
FIG. 3 shows a comparison of the solubilities of triethylene glycol and glycerol in supercritical $CO_2$ at 2000 psi from about 70 to 120° F.

FIG. 3 shows the solubilities of TEG and glycerol in $CO_2$ at 2000 psi. In such situations glycerol is two orders of magnitude less soluble than TEG throughout the temperature range from about 70° to 115° F.

Figure 4:
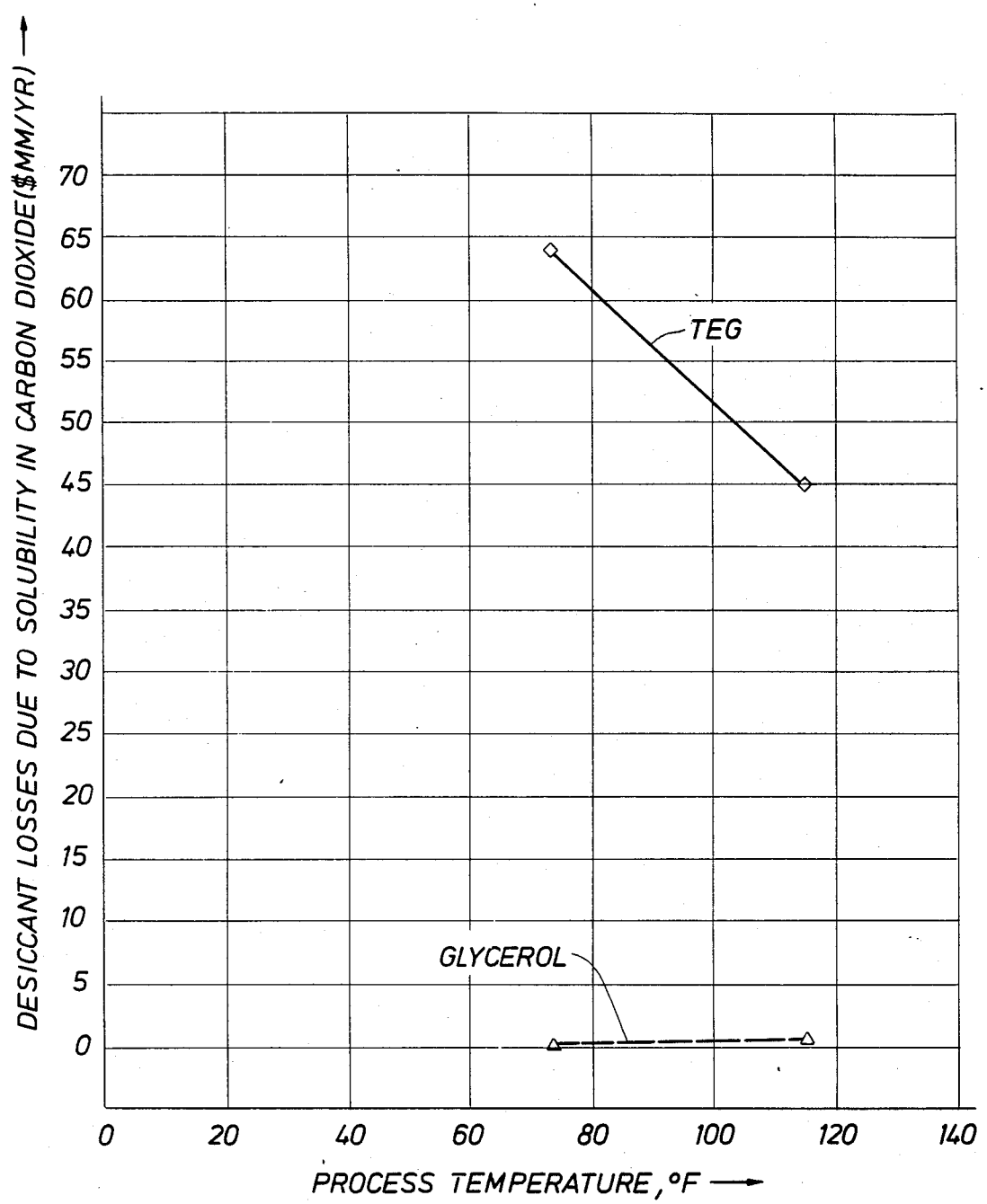
FIG. 4 shows the chemical costs in dollars per year due to the solubilities shown in FIG. 3.

FIG. 4 shows the magnitude of costs due to desiccant losses for TEG and glycerol in $CO_2$ at 2000 psi. Because the solubility of TEG in $CO_2$ is less temperature dependent at 2000 psi than at 1200 psi, feed preheating should not be successful in reducing TEG losses at 2000 psi. Even at 115° F. the TEG losses are about $45 million dollars per year for a 400 million standard cubic feet per day plant. In contrast, the losses of glycerol for the same plant are only about $1 million dollars per year.

In a $CO_2$ drying operation the solubility of the $CO_2$ in the drying agent is also important because of its impact on the desiccant regeneration. The desiccant should dissolve as little $CO_2$ as possible. Values of the infinite dilution activity coefficient, gamma, of $CO_2$ in glycerol and the glycols are shown in Table 4.

TABLE 4

| INFINITE DILUTION ACTIVITY COEFFICIENTS AND SOLUBILITIES OF $CO_2$ IN DRYING AGENTS | | |
|---|---|---|
| Drying Agent | $\gamma°$ at 77° F. | Solubility at 90° F., 1200 psi (SCF $CO_2$/lb Solvent) |
| Glycerol | 22 | 0.1 |
| EG | 18.5 | 0.1 |
| DEG | 6.5 | 0.4 |
| TEG | 3.5 | 0.8 |

Although the activity coefficients vary somewhat with concentration, the trend in Table 4 is clear. Of the desiccants shown, TEG is the best solvent for $CO_2$. The solubility of $CO_2$ in TEG at 90° F., 1200 psi is about 0.8 standard cubic feet per pound of TEG (about 0.24 mole fraction). The solubility of $CO_2$ in glycerol and the glycols may be estimated if one assumes that the ratio of activity coefficients in any two of the desiccants is roughly independent of concentration and temperature. The solubilities calculated from such an assumption are listed in Table 4. At those conditions $CO_2$ is about 8 times less soluble in glycerol than in TEG.

In gas drying operations TEG is usually regenerated by heating it to about 375° F. where the heating is done under a vacuum of about 300 mm of mercury. 99% pure TEG is obtained in this manner. Using the same vacuum, glycerol of a similar purity can be obtained by heating it to only about 320° F., thus requiring considerably less energy for its regeneration. In addition, glycerol can be regenerated to a 99% purity at about 284° F. in a vacuum of 250 mm of mercury. At these conditions, thermal stability does not seem to be a problem. Experiments have been conducted in which glycerol has been kept at 284° F. for up to about 7 days, with or without sodium chloride being present. Water was then added to the glycerol and the mixture distilled at 284° F. and 250 mm of mercury. A distillate and bottoms were collected and analyzed by gas chromatography. No decomposition products were found in either fraction.

Particularly attractive sources of $CO_2$ for use in oil recovery operations comprise subterranean reservoirs such as those in the McElmo Dome and Doe Canyon fields. In a particularly attractive $CO_2$ producing procedure, the $CO_2$ is produced as a supercritical single-phase fluid. This plus the desirability of supercritical pipelining provides a desirability for dehydrating the $CO_2$ at conditions above but near the critical point. In such operations, changes over several orders of magnitude can occur in the solubility of triethylene glycol in the $CO_2$ being dehydrated.

As known to those skilled in the art, numerous devices and arrangements are known for flowing a stream of gas into and out of contact with polyhydric alcohol liquid desiccants. In addition, appropriate means for avoiding problems of maintenance, corrosion prevention, and reactivation of spent desiccants, are known. Substantially any of such devices and procedures can be utilized in the present process.

The present process can be used in conjunction with corrosion inhibitors, hydrate inhibitors, and the like. For example, where produced supercritical $CO_2$ is to be flowed from producing wells to a central treating station, a hydrate inhibitor such as methanol can be added at the wellheads before the produced $CO_2$ enters gathering lines through which it is flowed into a central processing station, for example, in a manner such as that described in U.S. Pat. No. 4,235,289. Such an inhibitor can be condensed out of the $CO_2$ stream being treated by means of conventional procedures and devices.

One advantage of the present invention is the ease with which it can be adjusted to changing climatic conditions, pumping arrangements, and/or changing concentrations of fluids produced along with the $CO_2$ from subterranean reservoirs, or the like. Depending upon factors such as the conditions at which the dried $CO_2$ is injected into a pipeline, the conditions to which it will be subjected as it is transported into a use location, the number of pumping stations that will be involved, the expense and desirability of utilizing some corrosion inhibitor to maintain a selected same rate of corrosion while using less drying and thus leaving a higher water content, changes may be desirable from time to time in the maximum amount of water to be left in the dried $CO_2$.

Suitable hydrate inhibitors for use in the present process comprise relatively volatile water-soluble compounds having vapor pressures near those of water, such as lower alcohols, ethers and the like. Methyl alcohol is a particularly suitable hydrate inhibitor. Examples of other suitable inhibitors include ethylene glycol.

Suitable corrosion inhibitors for use in conjunction with the present process comprise commercially available oil-soluble amine, film-forming inhibitors.

What is claimed is:

1. A process for drying substantially supercritical moist $CO_2$ to provide $CO_2$ at a pressure from about 1200 to 2400 psi which comprises:

flowing a stream of moist $CO_2$ into and out of contact with sufficient glycerol to effect substantial drying while the $CO_2$ being contacted has a pressure between about 1200 and 2400 which is high enough and a temperature between about 70° to 120° F. which is low enough to substantially minimize the required amount of compressor horsepower while desiccant loss, product contamination and heat requirements are substantially minimized by the limited mutual solubility of the glycerol and supercritical $CO_2$.

2. The process of claim 1 in which the pressure of the inflowing moist $CO_2$ is as nearly equal as is feasible to the pressure at which the dried $CO_2$ is to be provided in view of other process constraints.

3. The process of claim 1 in which the temperature of the inflowing moist $CO_2$ is from about 70° to 80° F.

4. The process of claim 3 in which the pressure of the inflowing moist $CO_2$ is kept as near as is possible to that at which dried $CO_2$ is to be provided in view of other process constraints.

5. The process of claim 1 in which pressure of the inflowing moist $CO_2$ is at least about 2000 pounds and its temperature is from about 70° to 80° F.

* * * * *